(12) United States Patent
Louveaux

(10) Patent No.: US 7,151,546 B1
(45) Date of Patent: Dec. 19, 2006

(54) RESTRICTING SCOPE OF BLENDING MODES IN 2-D COMPOSITING USING ISOLATED GROUPS

(75) Inventor: Pierre Louveaux, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/562,797

(22) Filed: May 2, 2000

Related U.S. Application Data

(63) Continuation-in-part of application No. 09/470,260, filed on Dec. 22, 1999, now abandoned.

(51) Int. Cl.
*G09G 5/00* (2006.01)

(52) U.S. Cl. ............... 345/619; 345/629; 345/640; 345/421; 345/428; 345/582; 345/589; 345/591; 345/592

(58) Field of Classification Search ........... 345/592, 345/619, 642, 629, 421, 423, 428, 429, 582, 345/630, 420, 589, 593, 591, 426, 640
See application file for complete search history.

(56) References Cited

U.S. PATENT DOCUMENTS

| | | | |
|---|---|---|---|
| 4,893,116 A | | 1/1990 | Henderson et al. |
| 5,307,452 A | | 4/1994 | Hahn et al. |
| 5,363,475 A | | 11/1994 | Baker et al. |
| 5,583,974 A | * | 12/1996 | Winner et al. ............... 345/422 |
| 5,715,331 A | * | 2/1998 | Hollinger ............... 382/199 |
| 5,805,163 A | | 9/1998 | Bagnas |
| 5,864,342 A | | 1/1999 | Kajiya et al. |
| 5,874,967 A | | 2/1999 | West et al. |
| 5,937,104 A | * | 8/1999 | Henderson et al. ......... 382/279 |
| 5,984,367 A | | 11/1999 | Barnhart et al. |
| 6,014,147 A | * | 1/2000 | Politis et al. ............... 345/620 |
| 6,016,144 A | | 1/2000 | Blonstein et al. |
| 6,071,193 A | | 6/2000 | Suzuki |
| 6,118,427 A | | 9/2000 | Buxton et al. |
| 6,208,351 B1 | * | 3/2001 | Borg et al. ............... 345/600 |
| 6,296,900 B1 | | 10/2001 | Barnhart et al. |
| 6,348,953 B1 | | 2/2002 | Rybczynski |
| 6,377,269 B1 | * | 4/2002 | Kay et al. ............... 345/589 |
| 6,396,473 B1 | | 5/2002 | Callahan et al. |
| 6,397,262 B1 | | 5/2002 | Hayden et al. |
| 6,515,675 B1 | | 2/2003 | Bourdev |
| 2002/0153721 A1 | | 10/2002 | Brooks et al. |

FOREIGN PATENT DOCUMENTS

| | | |
|---|---|---|
| EP | 1 049 047 A2 | 11/2000 |
| JP | 409190522 A * | 7/1997 |
| WO | 96/13781 | 5/1996 |

OTHER PUBLICATIONS

Canvas™ 7 User's Guide, © 1999 Deneba Systems Inc., pp. 10.19, 10.20, 14.2-14.5, and 18.9-18.11.

Scalable Vecor Graphics (SVG) Specification, W3C Working Draft Feb. 11, 1999, World Wide Web Consortium, http://www.w3.org/TR/1999/WD-SVG-19990211/, Feb. 11, 1999, 37 pages.

(Continued)

*Primary Examiner*—Kimbinh T. Nguyen
(74) *Attorney, Agent, or Firm*—Fish & Richardson P.C.

(57) ABSTRACT

Methods and apparatus, including computer programs, for processing transparency attributes of digital graphics objects. The techniques result in the color compositing of an arbitrary structure of artwork elements defining the appearance of a page to produce a result color at any position on the page that is continuous with respect to all inputs.

24 Claims, 5 Drawing Sheets

OTHER PUBLICATIONS

Scalable Vecor Graphics (SVG) 1.0 Specification, W3C Working Draft Dec. 3, 1999, World Wide Web Consortium, http://www.w3.org/TR/1999/WD-SVG-19991203/, Dec. 3, 1999, 57 pages.

Aliaga, "Visualization of Complex Models Using Dynamic Texture-Based Simplification", Proceedings of Visualization '96, IEEE, 1996, pp. 101-106, 473.

Blinn, "Fun with Premultiplied Alpha", Computer Graphics and Applications, IEEE vol. 16, Issue 5, Sep. 1996, pp. 86-89.

Fekete, et al. "Using the Multi-Layer Model for Building Interactive Graphical Applications", ACM, 1996, pp. 109-118.

Gasparakis, "Multi-Resolution Multi-Field Ray Tracing: A Mathematical Overview", Mitsubishi Electric Information Technology Center America, Real Time Visualization, IEEE 1999, pp. 199-206.

Mulder, et al. "Pixel Masks for Screen-Door Transparency", IEEE, 1998, pp. 351-358, 550.

Shade, et al. "Layered Depth Images", SIGGRAPH '98, 12 pages.

Zongker, et al. "Environment Matting and Compositing", SIGGRAPH '99, Los Angeles, California, ACM, 1999 pp. 209-214.

\* cited by examiner

RESTRICTING SCOPE OF BLENDING MODES IN 2-D COMPOSITING USING ISOLATED GROUPS

CROSS-REFERENCE TO RELATED APPLICATION

This application is a divisional (and claims the benefit of priority under 35 USC 120) of U.S. application Ser. No. 09/470,260, filed Dec. 22, 1999 now abandoned.

BACKGROUND OF THE INVENTION

The present invention is related to the compositing and blending of digital artwork data.

Many graphics processing computer programs, such as the Adobe Illustrator® program, available from Adobe Systems Incorporated of San Jose, Calif., build a final image of vector and/or raster artwork by compositing two or more elements together. The elements may be thought of as drawn on stacked sheets of acetate. The density of the ink on the acetate controls the transparency of the sheet, i.e., the extent to which that sheet obscures the images from the underlying sheets.

Each element typically includes artwork data and compositing controls. The elements can be represented by an array of pixels or analytically, e.g., by using shape outlines, or by other functions which map positions to data values. In addition, the data can be dynamic, that is, computed from other data at the time the elements are composited.

SUMMARY OF THE INVENTION

To achieve transparency and other visual effects, a 2-D graphical primitive can be assigned an opacity and a blending mode in addition to a color. Conceptually, it is also possible to assign an opacity and a blending mode to a group of such primitives, to a group of such groups, and so on. The invention provides techniques that implement these attributes in a fully general way in generating an appearance for the document.

In general, in one aspect, the invention provides methods and apparatus, including computer programs, for compositing a transparency group of digital graphics objects. The techniques include compositing a transparency group of digital graphics objects; and generating a compositing result having no pure backdrop contribution from a backdrop of the group. Advantageous implementations can include the following features. The group contains a second group. The group is composited as an element of a third group. The group of objects is within a hierarchy of objects defining a page and the backdrop is defined by a composited state of the page before the first object of the group is processed. The compositing result is generated by removing the background from the result of compositing the last object in the group.

In general, in another aspect, the invention provides methods and apparatus, including computer programs, for processing digital artwork. The techniques include receiving a hierarchical tree structure of nested elements defining an appearance of a page, the tree including leaves, the leaves being artwork objects, the tree structure being defined by container elements that contain one or more leaves, containers, or both, multiple of the elements having respective blend modes associated with them; and compositing the structure to produce a result color at any position on the page, the result color being continuous with respect to all inputs when continuous blend modes are used.

In general, in another aspect, the invention provides methods and apparatus, including computer programs, for processing digital artwork. The techniques include attributing to an artwork object a separate shape and opacity having the property that the shape times opacity is equal to a transparency alpha.

In general, in another aspect, the invention provides methods and apparatus, including computer programs, for processing a group of digital graphical elements in a document. The techniques include determining whether the group of elements is defined as a knockout group; and rendering each graphical element of the group to knock out any number of contiguous elements underneath said each graphical element while compositing said each graphical element transparently with the rest of the document if the group is a knockout group.

In general, in another aspect, the invention provides methods and apparatus, including computer programs, for processing a group of digital graphical elements in a document. The techniques include determining whether a group of contiguous elements is designated as an isolated group; and ignoring any background color of the group when compositing the group to calculate a resulting color if the group is an isolated group.

In general, in another aspect, the invention provides methods and apparatus, including computer programs, for calculating the opacity of a transparency group on a document page, the group having a backdrop defined on or above the page, the backdrop having an opacity, and the beginning of the group being different from the beginning of the page. The techniques include initializing a group opacity accumulation value to zero; processing a group stack to accumulate the opacity of every element of the group without regard to any opacity of the page or of any artwork between the page and the beginning of the group; using the accumulation value at the end of the processing as the value of the opacity of the group; and computing the opacity of the page at the top of the group from the opacity of the group and the opacity of the page at the bottom of the group.

Advantages that can be seen in implementations of the invention include one or more of the following. Opacities and blending modes can be specified at all levels of the graphical object hierarchy. Thus, there is no need to worry about whether a given piece of art already contains transparency attributes: even if it does, it can be manipulated like a simple object (i.e., one that is not part of a group). Merely grouping elements does not change the appearance of the document. The most direct benefit of this is the absence of any changes in appearance when a user groups elements for reasons unrelated to color compositing. In addition, the appearance of the document changes gradually if any opacity value in the hierarchy is changed gradually. Thus, the operation of opacity controls is intuitive and predictable. In particular, a user can fade any set of elements gradually by first grouping them. Also, compositing occurs only where objects exist.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
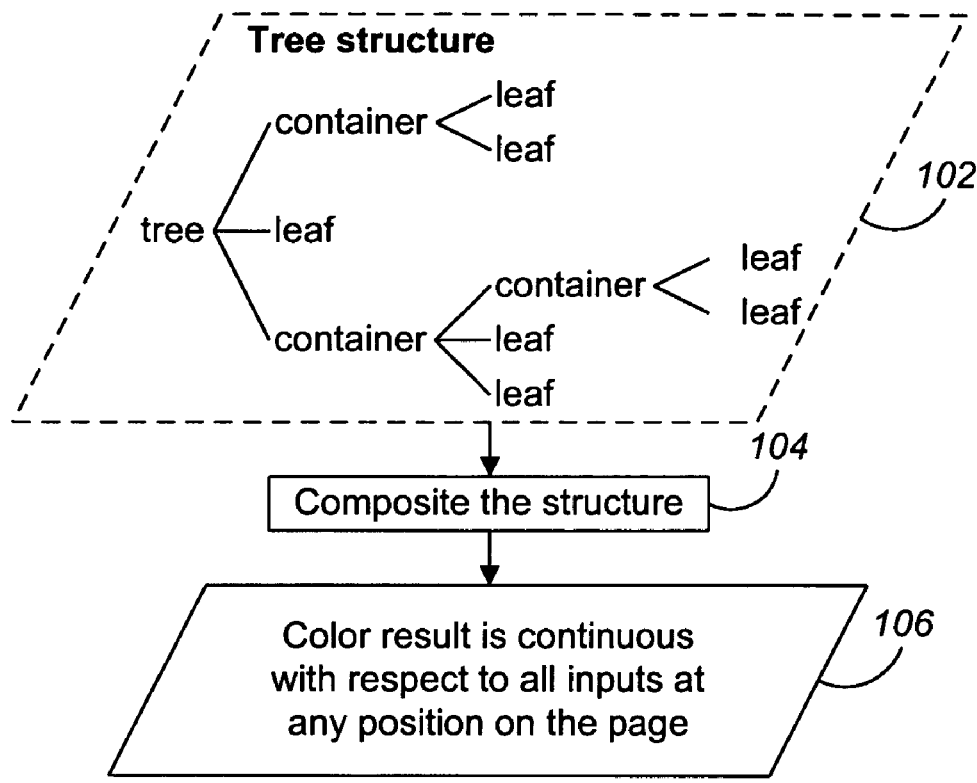
FIG. 1 illustrates the processing of digital artwork in accordance with the invention.

The invention provides a technology for processing transparency attributes of any kind of viewable object in a digital graphics processing system.

One can think of objects on a page of a document containing artwork as forming a stack, where the stacking order is defined to be the order in which the objects are specified, bottommost object first. In an opaque imaging model (i.e., with no transparency), the color of the page at any point is defined to be the color of the topmost object at that point, disregarding any overlapping objects lower in the stack. This effect can be realized simply by rasterizing objects directly to the page in the order in which they are specified.

Under a transparency imaging model, all of the objects in a stack can potentially contribute to the result. At any given point, the color of the page is defined to be the result of combining the colors of all enclosing objects in the stack, according to some compositing rules that the transparency model defines. The order in which objects are specified determines the stacking order, but not necessarily the order in which objects are actually painted onto the page.

A given object is composited with a backdrop. Ordinarily, the backdrop is the stack of all objects that have been specified previously. The result is then treated as the backdrop for compositing the next object. However, within certain kinds of groups (defined below), a different backdrop is chosen.

When an object is composited with the backdrop, the color at each point is modified by a function referred to as a transfer function or a blend mode, which is a function of both the object's color and the backdrop color. The blend mode determines how colors interact. Different blend modes can be used to achieve a variety of useful effects. A single blend mode is in effect for compositing all of a given object, but different blend modes can be applied to different objects.

The compositing of an object with the backdrop is mediated by two scalar quantities called shape and opacity. Conceptually, for each object, these quantities are defined at every point in the plane, just as if they were additional color components. (In actual practice, they are often obtained from auxiliary sources, rather than being intrinsic to the object itself.)

Both shape and opacity vary from 0 (no contribution) to 1 (maximum contribution). At any point where either the shape or the opacity is 0, the color is undefined. At any point where the shape is 0, the opacity is also undefined. The shape and opacity themselves are subject to compositing rules, so that the stack also has a shape and opacity at each point.

An object's opacity, in combination with the backdrop's opacity, determines the relative contributions of the backdrop's color, the object's color, and the blended color to the computed composite color. An object's shape then determines the degree to which the composite color replaces the backdrop color. Shape values of 0 and 1 identify points that lie "outside" and "inside" a familiar sharp-edged object, but intermediate values are useful in defining soft-edged objects.

Shape and opacity are very similar concepts. In most situations, they can be combined into a single value, called alpha, which controls both the color compositing computation and the fading between the object and the backdrop. However, in a few situations they are treated separately as will be described.

One or more consecutive objects in a stack can be collected together into a transparency group, which in this context will be referred to simply as group. A group as a whole can have various properties that modify the compositing behavior of objects within the group and their interactions with the backdrop of the group. Additionally, an additional blend mode, shape, and opacity can be associated with the group as a whole and used when compositing the group with its backdrop. Groups can be nested within other groups, so that the group hierarchy forms a tree structure 102, as shown in FIG. 1. The tree structure 102 can be defined by one or more containers (groups), each containing one or more leaves (objects), containers (groups), or both. Note that the concept of a transparency group is independent of existing notions of "group" or "layer" in graphics applications. The tree structure 102 can be composited (step 104) to produce a color result 106 at any position on the page, the color result 106 being continuous with respect to all inputs.

The color result of compositing a group can be converted to a single-component luminosity value and treated as a soft mask (or mask, for short). Such a mask can then be used as an additional source of shape or opacity values during subsequent compositing operations. When the mask is used as shape, this technique is known as soft clipping; it is a generalization of the conventional clipping path.

The current page is generalized to be a group composed of the entire stack of objects placed on the page, composited with a backdrop that is white and fully opaque. In contexts where a "page" is to be treated as a piece of artwork to be placed on some other page, it is not treated as a page but as a group, whose backdrop may be defined differently.

The following conventions are used for variable names used in this specification. In general, a lower-case letter represents a scalar quantity, such as an opacity. An upper-case letter represents an n-tuple of scalar values, such as a color.

In the descriptions of the basic color compositing computations, color values are generally represented by the letter C, with a mnemonic suffix that indicates which of several color values is being referred to; for instance, $C_s$ stands for "source color". Shape and opacity values are represented with the letters f (for "form factor") and q (for "opaqueness"), with a mnemonic suffix, such as qs for "source opacity." The symbol $\alpha$ (alpha) stands for the product of the corresponding shape and opacity values.

In the descriptions of group transparency, the basic formulas are recast as recurrence relations and augmented with other formulas specifying group behavior. In that context, variables have a further, numeric subscript indicating the position in the stack that the quantity is associated with, with the bottommost object numbered 0. Thus, $C_{s_i}$ stands for "source color of the ith object in the stack".

In certain computations, one or more variables may have undefined values; for instance, when opacity is zero, the corresponding color is undefined. A value can also be undefined if it results from a division by zero. In any formula that uses the undefined value, the value has no effect on the ultimate result because it is subsequently multiplied by zero or otherwise cancelled out, so any non-zero value can be used. For convenience, by convention, 0/0=0.

In the transparency model, the result of painting (i.e., the result color) is a function of both the color being painted (the source color) and the color it is being painted over (the backdrop color). Both of these latter colors may vary as a function of position on the page, but for clarity of exposition this description will treat a fixed point in the page and assume a fixed source and backdrop color.

Other parameters in this computation are the alpha, which specifies the relative contributions of the source and backdrop colors, and the blend mode, which allows one to customize how the source and backdrop colors are combined in the painting operation. The color compositing function, or just compositing function for short, determines the color result of a painting operation:

$$Cr = \left(1 - \frac{\alpha s}{\alpha r}\right) \cdot Cb + \frac{\alpha s}{\alpha s} \cdot ((1 - \alpha b) \cdot Cs + \alpha b \cdot B(Cb, Cs)) \quad \text{(Eq. 1)}$$

where the variable definitions are given in the following table.

| Variable | Meaning |
|----------|---------|
| αb | Backdrop alpha |
| αr | Result alpha |
| αs | Source alpha |
| B(Cb, Cs) | Function implementing the blend mode |
| Cb | Backdrop color |
| Cr | Result color |
| Cs | Source color |

This is actually a simplified form of the compositing function where the shape and opacity values are combined and represented as a single alpha value. The more general form is presented later.

The compositing function operates on colors. If the colors are represented by more than one scalar value, then the computation treats them as vector quantities. To be precise, Cb, Cr, Cs, and B(Cb, Cs) will all have n elements, where n is the number of components in the color space used for compositing. The above formula is then a vector function: the ith component of Cr is obtained by plugging in the ith components of Cs, Cb and B(Cb, Cs).

The result of the computation will depend on the color space in which the colors are represented. The color space used to represent colors for the computation is called the blending color space. When necessary, source colors are converted to the blending color space prior to the compositing computation.

The blending and compositing formulas assume that the range per color component is from 0 to 1, and that the color space is additive. When blending operations are performed in subtractive color spaces, the color component values are complemented (i.e., C becomes 1−C) before the blend mode function is applied, and the results of the function are then complemented before being passed on. This adjustment makes the effect of the blend modes numerically consistent across all color spaces.

The B(Cb, Cs) term of the compositing function is used to customize the blending operation. This function of two colors is called the blend mode. Although standard functions have been defined, this could be any function of the source and backdrop colors that returns another color. Generally, blend modes are defined by a scalar function that is applied separately to each color component, expressed in additive form:

$$cr = B(cb, cs)$$

where the lower-case cr, cs, and cb denote one component of the colors Cr, Cs, and Cb. Such a blend mode is called separable. This is in contrast to a function where the result for a particular component is a function of components other than the corresponding component in the backdrop and source colors.

The simplest blend mode, Normal, is defined by B(Cb, Cs)=Cs. With this blend mode the compositing formula collapses to a simple weighted average of the source and backdrop colors, controlled by the source and backdrop alpha values.

If the blend mode is a more interesting function of the source and backdrop colors then the source and backdrop alphas control whether this effect is fully realized, or whether it is toned down by mixing the result with the source and backdrop colors. With any blend mode, $\alpha s=0$ or $\alpha b=0$ results in no blend mode effect; $\alpha s=1$ and $\alpha b=1$ results in maximum blend mode effect.

The color compositing function (Equation 1, above) produces a result color that is a weighted average of the source color, the backdrop color, and the B(Cb, Cs) term, with the influence of the source and backdrop colors is controlled by the source and backdrop alphas, respectively. The influence of the blend function is controlled by the product of the source and backdrop alphas.

Another variable, the result alpha, also appears in the function. This is actually a computed result, described later. The result color is normalized by the result alpha. This ensures that when this color and alpha are subsequently used together in another compositing operation, the color's contribution will be correctly represented. If the result alpha is zero, the result color is undefined.

The color compositing formula (Equation 1) is a simplification of the following formula, which presents the relative weights of the pure backdrop contribution and the contributions of source and blended colors in a more straightforward fashion:

$$\alpha r \cdot Cr = (1-\alpha s) \cdot \alpha b \cdot Cb + (1-\alpha b) \cdot \alpha s \cdot Cs + \alpha b \cdot \alpha s \cdot B(Cb, Cs)$$

The simplification requires a substitution based on the alpha compositing formula $$\alpha r = \alpha b + \alpha s - \alpha b \cdot \alpha s$$

As indicated earlier, alpha is simply the product of shape and opacity:

$$\alpha b = fb \cdot qb$$

$$\alpha r = fr \cdot qr$$

$$\alpha s = fs \cdot qs$$

The shape and opacity values can come from several sources, and in particular from sources of type object, mask, and constant. For example, elementary objects, such as strokes, fills, and text, have an intrinsic shape, whose value is 1 for points inside the object and 0 outside. Similarly, a masked image with a binary mask has a shape that is 1 in the unmasked portions and 0 in the masked portions. The shape of an aggregation is the union of the shapes of the objects it contains. Mathematically, elementary objects have "hard"

edges, with shape value either 0 or 1 at any given point. However, when such objects are rasterized to device pixels, the shape values along the boundaries may take on fractional values, representing fractional coverage of those pixels. Similarly, elementary objects have an opacity of 1 everywhere. The opacity of an aggregation is the result of the opacity computations for all the objects it contains.

The range of all shape and opacity inputs is from 0 to 1, and the default value for all of them is 1. The intent is that the painting operation will become more transparent as any of the inputs goes towards 0. If more than one input goes towards 0 then the result is compounded. This is achieved mathematically simply by multiplying the three inputs of each type, producing intermediate values called the source shape and the source opacity.

$$fs = fj \cdot fm \cdot fk$$

$$qs = qj \cdot qm \cdot qk$$

where the variable definitions are given the following table.

| Variable | Meaning |
|---|---|
| fj | Object shape |
| fk | Constant shape |
| fm | Mask shape |
| fs | Source shape |
| qj | Object opacity |
| qk | Constant opacity |
| qm | Mask opacity |
| qs | Source opacity |

In parallel with computing a result color, the painting operation also computes a result shape and a result opacity value. These values define the shape and opacity associated with the result color.

Compositing of shape and opacity values is done by the union function:

$$\mathrm{Union}(b,s) = 1 - (1-b) \cdot (1-s) = b + s - b \cdot s$$

where b and s are the backdrop and source values of one of the components. This can be thought of as an "inverted multiply": it is just a multiply with the inputs and outputs complemented. The result tends toward 1; if either input is 1 then the result is 1. This is a generalization of the conventional concept of "union" for solid shapes.

The result shape and opacity are given by:

$$fr = \mathrm{Union}(fb, fs)$$

$$qr = \frac{\mathrm{Union}(fb \cdot qb, \, fs \cdot qs)}{fr}$$

where the variable definitions are given in the following table.

| Variable | Meaning |
|---|---|
| fb | Backdrop shape |
| fr | Result shape |
| fs | Source shape |
| qb | Backdrop opacity |

-continued

| Variable | Meaning |
|---|---|
| qr | Result opacity |
| qs | Source opacity |

These formulas can be interpreted as follows.

The result shape is simply the union of the backdrop and source shapes.

The result opacity is the union of the backdrop and source opacities, each of whose contribution is determined by its respective shape. The result is then normalized by the result shape. This ensures that when this shape and opacity are subsequently used together in another compositing operation, the opacity's contribution will be correctly represented.

Because alpha is just the product of shape and opacity, $$\alpha r = \mathrm{Union}(\alpha b, \alpha s)$$

This formula can be used whenever the independent shape and opacity results are not needed.

Below is a summary of all the computations from the previous section and this one. They are given in an order such that no variable is used before it is computed; also, some of the formulas have been rearranged to simplify them. Recall that these computations occur at each point in the page being painted.

$$\mathrm{Union}(b,s) = 1 - (1-b) \cdot (1-s) = b + s - b \cdot s$$

$$fs = fj \cdot fm \cdot jk$$

$$qs = qj \cdot qm \cdot qk$$

$$fr = \mathrm{Union}(fb, fs)$$

$$\alpha b = fb \cdot qb$$

$$\alpha s = fs \cdot qs$$

$$\alpha r = \mathrm{Union}(\alpha b, \alpha s)$$

$$qr = \frac{\alpha r}{fr}$$

$$Cr = \left(1 - \frac{\alpha s}{\alpha r}\right) \cdot Cb + \frac{\alpha s}{\alpha r} \cdot ((1 - \alpha b) \cdot Cs + \alpha b \cdot B(Cb, Cs))$$

A group is a sequence of consecutive objects in a stack that are collected together and composited to produce a single color, shape, and opacity at each point. The result is then treated as if it were a single object for subsequent compositing operations. This facilitates creating independent pieces of artwork, each composed of many objects, and then combining them, possibly with additional transparency effects during the combination. Groups can be nested within other groups in a strict nesting, so that the group hierarchy forms a tree structure.

The objects of a group are treated as a separate stack, called the group's stack. The objects in the stack are composited against some backdrop (which will be described later), producing a composite color, shape, and opacity for the group as a whole. The result is an object whose shape is the union of the shapes of all constituent objects and whose color and opacity are the result of the compositing operations. This object is in turn composited with the group's backdrop in the usual way.

In addition to the computed color, shape, and opacity, the group as a whole can have several additional attributes:

- All of the input variables that affect the compositing computation for an object can also be applied when compositing the group with its backdrop. These include mask and constant shape, mask and constant opacity, and blend mode.
- The group can be isolated or non-isolated, determining the initial backdrop against which the group's stack is composited.
- The group can be knockout or non-knockout, determining whether the objects within the group's stack are composited with one another, or only with the stack's backdrop.
- An isolated group can specify its own blending color space, independent of the blending color space of the group's backdrop.
- Instead of being composited onto the current page, a group's results can be used as a source of shape or opacity values for creating a soft mask.

To deal with multiple objects at a time, the following notation will be used for distinguishing among them. The variables used earlier will be altered to include a subscript that indicates the associated object's position in the stack. The subscript 0 indicates the initial backdrop; subscripts 1 through n indicate the bottommost through topmost objects in an n-element stack; subscript i indicates the object that is currently of interest. Additionally, the b and r suffixes are dropped from the variables $\alpha b$, $Cb$, $fb$, $qb$, $\alpha r$, $Cr$, $fr$ and $qr$; other variables retain their suffixes.

This convention permits the compositing formulas to be restated as recurrence relations among elements of a stack. For instance, the result of the color compositing computation for object i is denoted by $C_i$ (previously $C_r$). This computation takes as one of its inputs the immediate backdrop color, which is the result of the color compositing computation for object i−1; this is denoted by $C_{i-1}$ (previously $C_b$).

The revised formulas for a simple stack (not including any groups) are:

$$fs_i = fj_i \cdot fm_i \cdot fk_i$$

$$qs_i = qj_i \cdot qm_i \cdot qk_i$$

$$f_i = \text{Union}(f_{i-1}, fs_i)$$

$$\alpha s_i = fs_i \cdot qs_i$$

$$\alpha_i = \text{Union}(\alpha_{i-1}, \alpha s_i)$$

$$q_i = \frac{\alpha_i}{f_i}$$

$$C_i = \left(1 - \frac{\alpha s_i}{\alpha_i}\right) \cdot C_{i-1} + \frac{\alpha s_i}{\alpha_i} \cdot ((1 - \alpha_{i-1}) \cdot Cs_i + \alpha_{i-1} \cdot B_i(C_{i-1}, Cs_i))$$

where the variable definitions are given in the following table.

| Variable | Meaning |
| --- | --- |
| $\alpha s_i$ | Source alpha |
| $\alpha_i$ | Result alpha (after compositing object i) |
| $B_i(C_{i-1}, Cs_i)$ | Function implementing the blend mode |
| $Cs_i$ | Source color |
| $C_i$ | Result color (after compositing object i) |
| $fj_i$ | Object shape |
| $fk_i$ | Constant shape |
| $fm_i$ | Mask shape |
| $fs_i$ | Source shape |
| $f_i$ | Result shape (after compositing object i) |
| $qj_i$ | Object opacity |
| $qk_i$ | Constant opacity |
| $qm_i$ | Mask opacity |
| $qs_i$ | Source opacity |
| $q_i$ | Result opacity (after compositing object i) |

As indicated earlier, the elements of a group are treated as a separate stack, the group's stack. Those objects are composited (against a selected initial backdrop, to be described), and the resulting color, shape, and opacity are then treated as if they belonged to a single object. The resulting object is in turn composited with the group's backdrop in the usual way.

This manipulation entails interpreting the stack as a tree. For an n-element group that begins at position i in the stack, it treats the next n objects as an n-element substack, whose elements are given an independent numbering of 1 through n. Those objects are removed from the object numbering in the containing stack. They are replaced by the group object, numbered i, followed by the remaining objects that are painted on top of the group, renumbered starting at i+1. This operation applies recursively to any nested groups.

Figure 2:
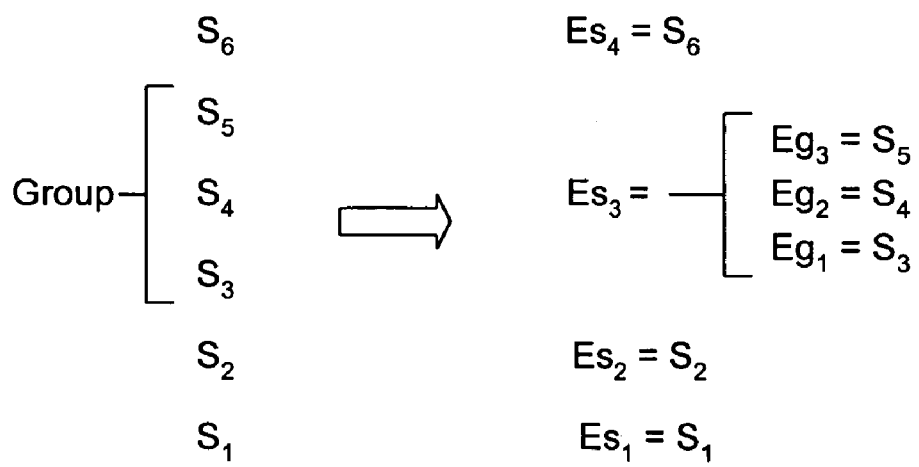
FIG. 2 illustrates the rearrangement of an artwork stack as a tree in accordance with the invention.

FIG. 2 illustrates this rearrangement. The illustrated stack contains 6 objects, $S_1$ through $S_6$, of which $S_3$ through $S_5$ belong to a group. This is rearranged into a tree consisting of an outer stack with elements $Es_1$ through $Es_4$, where $Es_3$ is a group whose stack consists of elements $Eg_1$ through $Eg_3$. Henceforth, the term element (denoted $E_j$) refers to a member of some group; it can itself be either an object or a group.

From the perspective of a particular element in a nested group, there exist three different backdrops of interest.

1. Group backdrop—the result of compositing all elements up to but not including the first element of the group.

2. Initial backdrop—a backdrop that is selected for compositing the group's first element. This is either the same as the group backdrop (for a non-isolated group) or a fully transparent backdrop (for an isolated group).

3. Immediate backdrop—the result of compositing all elements of the group up to but not including the current element of interest.

When all elements of a group have been composited, the result is treated as if the group were a single object, which is then composited with the group backdrop. (Note that this operation occurs regardless of whether the group backdrop or a transparent backdrop was chosen as the initial backdrop for compositing the elements of the group. There is a special correction to ensure that the backdrop's contribution to the overall result is included only once.)

The color and opacity of a group are defined by the group compositing function:

$$(C, f, \alpha) = \text{Composite}(C_0, \alpha_0, G)$$

where the variable definitions are given in the following table.

| Variable | Meaning |
|---|---|
| $\alpha_0$ | Alpha of the group's backdrop |
| $\alpha$ | Computed alpha of the group, to be used as the object alpha when the group itself is treated as an object |
| $C_0$ | Color of the group's backdrop |
| $C$ | Computed color of the group, to be used as the source color when the group itself is treated as an object |
| $f$ | Computed shape of the group, to be used as the object shape when the group itself is treated as an object |
| $G$ | The group: a compound object consisting of all the elements $E_1 \ldots E_n$ of the group, i.e., the n constituent objects' colors, shapes, opacities, and blend modes |

Note that the opacity is not given explicitly as an argument or result of this function. When needed, the opacity can be computed by dividing the alpha by the associated shape. Almost all of the computations use the product of shape and opacity (i.e., alpha) rather than opacity by itself, so it is usually convenient to keep track of shape and alpha, rather than shape and opacity.

The result of calling the Composite function is then treated as if it were an object, which is composited with the group's backdrop according to the normal formulas. In those formulas, the returned color C is treated as the source color Cs; the returned shape and alpha, f and $\alpha$, are treated as the object shape and alpha, fj and $\alpha$j.

The definition of the Composite function (for a non-isolated, non-knockout group) is as follows:

Initialization:

$$fg_o = \alpha g_o = o$$

For each group element $E_i$ in G, $i \in [1, n]$:

$$\langle Cs_i, fj_i, \alpha j_i \rangle = \begin{cases} \text{Composite}(C_{i-1}, \alpha_{i-1}, E_i) & \text{if } E_i \text{ is a group} \\ \text{intrinsic color, shape, and(shape} \cdot \text{opacity)of } E_i & \text{otherwise} \end{cases}$$

$$fs_i = fj_i \cdot fk_i \cdot fm_i$$

$$\alpha s_i = \alpha j_i \cdot (fk_i \cdot qk_i) \cdot (fm_i \cdot qm_i)$$

$$fg_i = \text{Union}(fg_{i-1}, fs_i)$$

$$\alpha g_i = \text{Union}(\alpha g_{i-1}, \alpha s_i) = 1 - (1-\alpha g_{i-1}) \cdot (1-\alpha s_i)$$

$$\alpha_i = \text{Union}(\alpha_o, \alpha g_i) = 1 - (1-\alpha_0) \cdot (1-\alpha g_i)$$

$$C_i = \left(1 - \frac{\alpha s_i}{\alpha_i}\right) \cdot C_{i-1} + \frac{\alpha s_i}{\alpha_i} \cdot ((1-\alpha_{i-1}) \cdot Cs_i + \alpha_{i-1} \cdot B_i(C_{i-1}, Cs_i))$$

Result:

$$C = C_n + (C_n - C_o) \cdot \left(\frac{\alpha_o}{\alpha g_n} - \alpha_o\right)$$

$$f = fg_n$$

$$\alpha = \alpha g_n$$

where the variable definitions are given in the following table.

| Variable | Meaning |
|---|---|
| $\alpha s_i$ | Source alpha |
| $\alpha g_i$ | Group alpha: the accumulated source alphas of group elements $E_1$ through $E_i$ only, excluding the group's backdrop $\alpha_0$ |
| $\alpha j_i$ | Object alpha for $E_i$, i.e., the product of the object shape and object opacity. This is an intrinsic attribute of an elementary object (one that is not a group); it is a computed result for a group. |
| $\alpha_i$ | Accumulated alpha (after compositing object i), including the group's backdrop $\alpha_0$ |
| $B_i(C_{i-1}, Cs_i)$ | Function implementing the blend mode for $E_i$ |
| $Cs_i$ | Source color for $E_i$. This is an intrinsic attribute of an elementary object; it is a computed result for a group. |
| $C_i$ | Accumulated color (after compositing object i), including the group's backdrop |
| $E_i$ | Element i of the group. This is a compound variable representing the color, shape, opacity, and blend mode parameters that either are intrinsic to the object or are associated input variables. |
| $fj_i$ | Object shape for $E_i$. This is an intrinsic attribute of an elementary object (one that is not a group); it is a computed result for a group. |
| $fk_i$ | Constant shape for $E_i$ |
| $fm_i$ | Mask shape for $E_i$ |
| $fs_i$ | Source shape |
| $fg_i$ | Group shape: the accumulated source shapes of group elements $E_1$ through $E_i$ only, excluding the group's backdrop |
| $qk_i$ | Constant opacity for $E_i$ |
| $qm_i$ | Mask opacity for $E_i$ |

As stated above, $E_i$ is a compound variable representing an element of a group. If the element is itself a group, it represents all the elements of that group. When Composite is called with $E_i$ as an argument, this means to pass the entire group that $E_i$ represents. This group is represented by the G variable inside the recursive call to Composite; it is expanded and its elements are denoted by $E_1 \ldots E_n$.

Note that the elements of a group are composited onto a backdrop that includes the group's backdrop. This is to achieve the correct effects of the blend modes, most of which are dependent on both the source and backdrop colors being blended. (This feature distinguishes a non-isolated group from an isolated group, which will be discussed later.)

Figure 3:
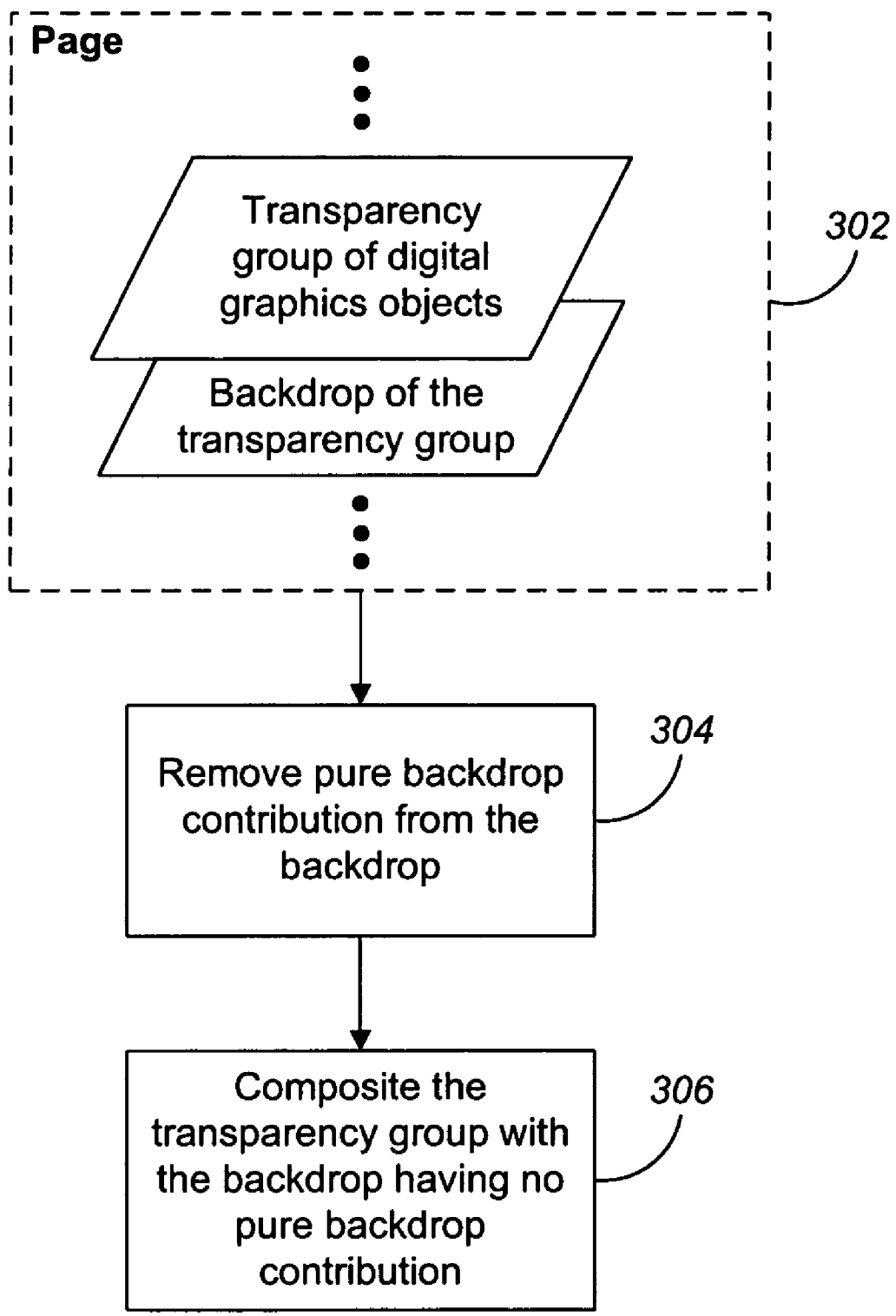
FIG. 3 shows a process for generating a composite result having no pure background contribution.

Special attention should be directed to the formulas at the end that compute the C, f, and $\alpha$ results that are returned from the Composite function. Essentially, they remove the contribution of the group backdrop (which may be referred to as "the pure backdrop contribution") from the computed results. That is, as shown in FIG. 3, the pure backdrop contribution is removed from the accumulated group shown as the box 302 (step 304). This ensures that when the group is subsequently composited with that backdrop (possibly with additional shape or opacity inputs or a different mode) (step 306), the backdrop's contribution is included only once.

For color, the backdrop removal is accomplished by an explicit calculation, whose effect is essentially the reversal of compositing with Normal blend mode. The formula is a simplification of the following formulas that present this operation more intuitively:

$$bf = \frac{(1-\alpha g_n) \cdot \alpha_o}{\text{Union}(\alpha_o, \alpha g_n)}$$

$$C = \frac{C_n - bf \cdot C_o}{1 - bf}$$

where bf is the backdrop fraction, that is, the relative contribution of the backdrop color to the overall color.

For shape and alpha, backdrop removal is accomplished by maintaining two sets of variables to hold the accumulated values. The group shape and alpha, $fg_i$ and $\alpha g_i$, accumulate only the shape and alpha of the group elements, excluding the group backdrop; their final values become the group results returned by Composite. The complete alpha, $\alpha_i$, includes the backdrop contribution as well; its value used in the color compositing computations.

As a result of these corrections, the effect of compositing objects as a group is the same as compositing them separately, without grouping, if both of the following conditions are true. First, the group is non-isolated and has the same knockout attribute as its parent group. Second, when compositing the group's results with the group backdrop, the Normal blend mode is used and the shape and opacity inputs are always 1.

Figure 4:
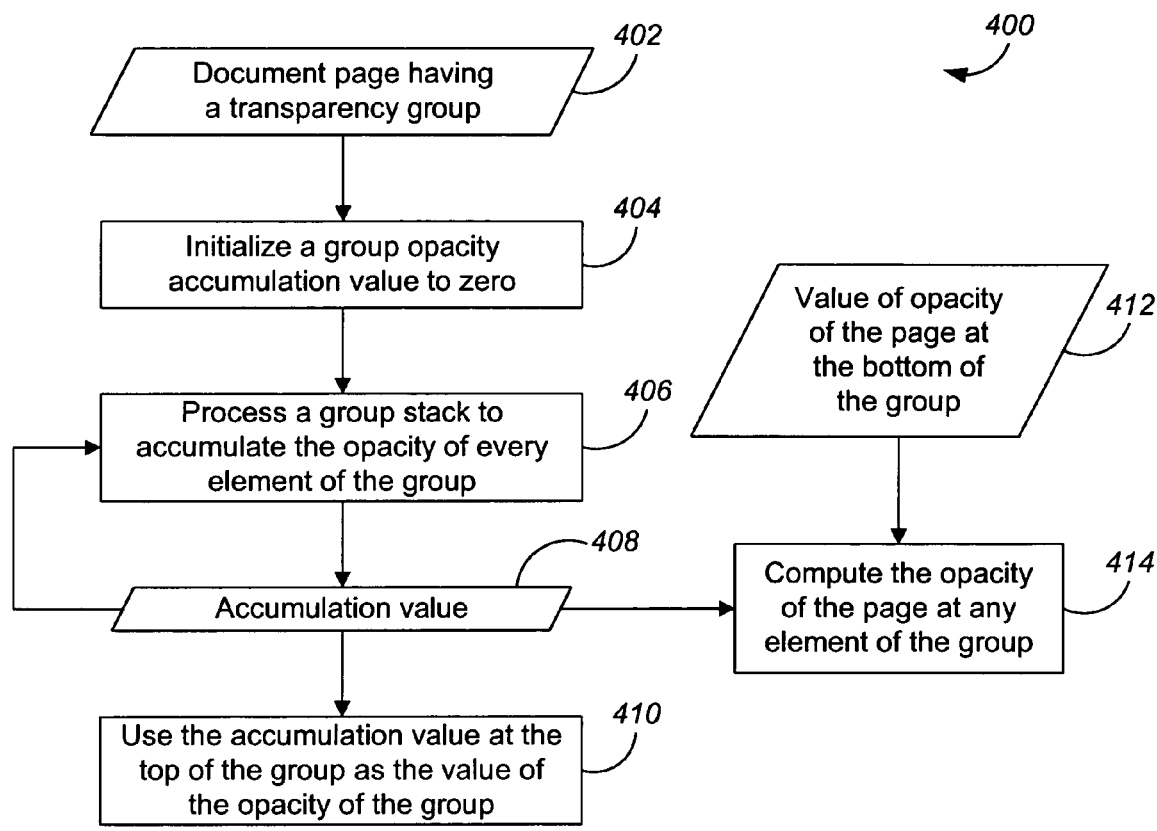
FIG. 4 shows a process for calculating the opacity of a transparency group on a document page.

FIG. 4 shows a process 400 for calculating the opacity of a transparency group on a document page 402. The group can have a backdrop defined on or above the page 402, the backdrop having an opacity, and the beginning of the group being different from the beginning of the page 402. A group opacity accumulation value is first initialized to zero (step 404). A group stack is then processed to accumulate the opacity of every element of the group without regard to any opacity of the page or of any artwork between the page and the beginning of the group (step 406). The accumulation value 408 at the end of the processing is used as the value of the opacity of the group (step 410). The opacity of the page at any element of the group can be computed (step 414) from the accumulated opacity of the group at that element 408 and the opacity of the page at the bottom of the group 412.

Figure 5:
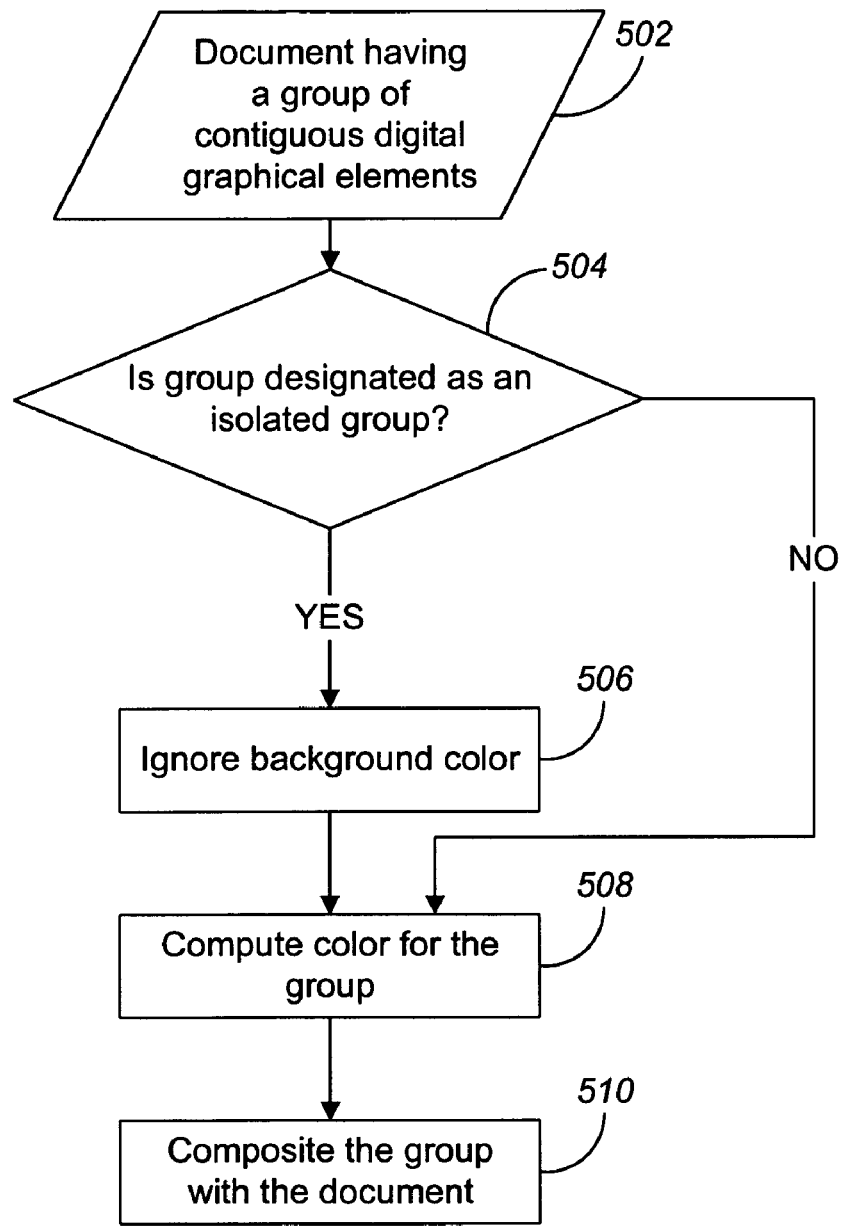
FIG. 5 shows a process for compositing an isolated group of elements with a document.

An isolated group is one whose elements are composited onto a fully transparent initial backdrop rather than onto the group's backdrop. As shown in FIG. 5, if a group of contiguous elements in a document 502 is designated as an isolated group (step 504), the background color is ignored (step 506) when the color for the group is computed (step 508). The resulting source color, object shape, and object alpha for the group are independent of the group backdrop. The only interaction with the group backdrop occurs when the group's computed color, shape, and alpha are then composited with it (step 510).

In particular, the special effects produced by the blend mode of objects within the group take into account only the intrinsic colors and opacities of those objects; they are not influenced by the group's backdrop. For example, the Multiply blend mode—defined as Multiply (cb, cs)=cb·cs—will produce a shadowing effect upon other objects lower in the group's stack, but it will not produce a shadow on the group's backdrop.

The effect of an isolated group can be represented by a simple object that directly specifies a color, shape, and opacity at each point. This so-called "flattening" of an isolated group is sometimes useful for import and export of fully-composited artwork to other documents or files. Additionally, an isolated group can specify an explicit blending color space.

For an isolated group, the group compositing function is altered simply by adding one statement to the initialization:

If the group is isolated: $\alpha_o = 0$

That is, the initial backdrop on which the elements of the group are composited is transparent, rather than being inherited from the group's backdrop. This substitution also makes $C_o$ undefined, but the normal compositing formulas take care of that. Additionally, the result computation for C automatically simplifies to $C=C_n$, because there is no backdrop contribution to be factored out.

Figure 6:
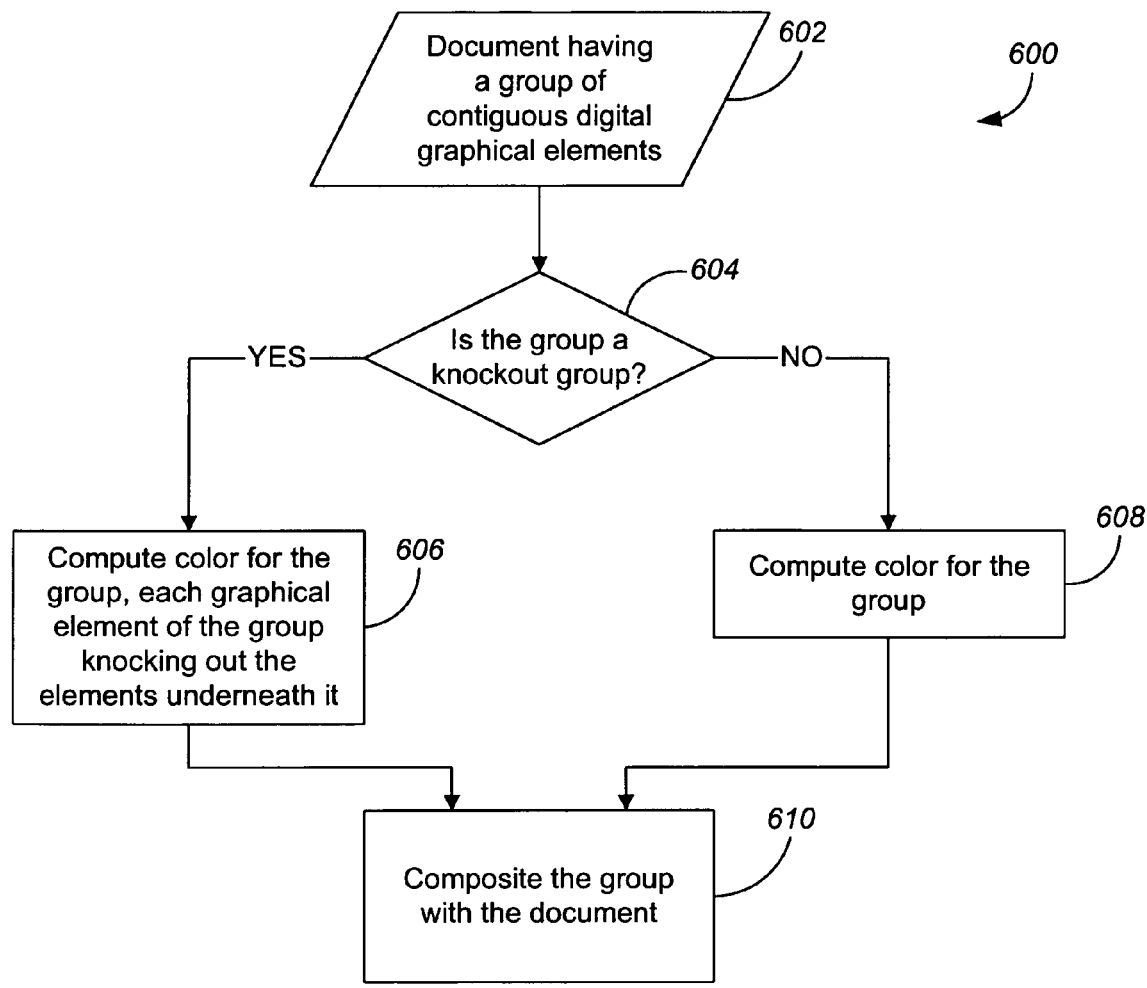
FIG. 6 shows a process for compositing a knockout group of elements with a document.

In a knockout group, each individual element is composited with the group's initial backdrop, rather than with the stack of preceding elements in the group. When objects have binary shapes (1 for "inside," 0 for "outside"), each object "knocks out" the effects of any overlapping elements within the same group. At any given point, only the topmost object enclosing the point contributes to the result color and opacity of the group as a whole. As shown in FIG. 6, if a group of contiguous elements in a document 602 is designated as a knockout group (step 604), each element of the knockout group "knocks out" the element underneath it when the color for the group is computed (step 606). If the group is not designated as a knockout group, a non-knockout computation is performed to obtain the color for the group (step 608). Once the color for the group is computed, the group can be composited with the document (step 610).

This model is similar to a conventional opaque painting model, except that the "topmost object wins" rule applies to both the color and the opacity. Knockout groups are useful in composing a piece of artwork from a collection of overlapping objects, where the topmost object in any overlap completely obscures the objects underneath. At the same time, the topmost object interacts with the group's initial backdrop in the usual way, with its opacity and blend mode applied as appropriate.

The concept of "knockout" can be generalized to accommodate fractional shape values. In that case, the immediate backdrop is only partially knocked out and replaced by only a fraction of the result of compositing the object with the initial backdrop.

The compositing function is restated to deal with knockout groups by introducing a new variable, b, which is a subscript indicating which previous result to use as the backdrop in the compositing computations: 0 for a knockout group; i−1 for a non-knockout group. When b=i−1, the formulas simplify to the ones given earlier.

In the general case, the computation proceeds in two stages:

1. Composite the object with the group's initial backdrop, but disregarding the object's shape and using a source shape value of 1 everywhere. This produces unnormalized temporary alpha and color results, at and Ct. (For color, this computation is essentially the same as the unsimplified color compositing formula, but using a source shape of 1.)

$$\alpha t = \text{Union}(\alpha g_b, qs_i)$$

$$Ct = (1-qs_i) \cdot \alpha_b \cdot C_b + qs_i \cdot ((1-\alpha_b) \cdot Cs_i + \alpha_b \cdot B_i(C_b, Cs_i))$$

2. Compute a weighted average of this result with the object's immediate backdrop, using the source shape as the weighting factor. Then normalize the result color by the result alpha.

$$\alpha g_i = (1-fs_i)\cdot \alpha g_{i-1} + fs_i \cdot \alpha t$$

$$\alpha_i = \text{Union}(\alpha_o, \alpha g_i)$$

$$C_i = \frac{(1-fs_i)\cdot \alpha_{i-1}\cdot C_{i-1} + fs_i \cdot Ct}{\alpha_i}$$

This averaging computation is performed for both color and alpha. The above formulas show this averaging directly. The formulas given below are slightly altered to use source shape and alpha, rather than source shape and opacity, avoiding the need to compute a source opacity value explicitly. (Note that Ct there is slightly different from Ct above; it is premultiplied by $fs_i$.)

The extreme values of the source shape produce the binary "knockout" effect. That is, a shape of 1 ("inside") yields the color and opacity that result from compositing the object with the initial backdrop. A shape of 0 ("outside") leaves the previous group results unchanged. The existence of the knockout feature is one reason for maintaining a separate shape value, rather than only a single alpha value that combines shape and opacity. The separate shape value must be computed in any group that is subsequently used as an element of a knockout group.

A knockout group can be non-isolated or isolated; that is, isolated and knockout are independent attributes of a group. A non-isolated knockout group composites its topmost enclosing element with the group's backdrop; an isolated knockout group composites the element with a transparent backdrop.

The following restatement of the group compositing function also takes isolated groups and knockout groups into account.

Initialization:

$$fg_o = \alpha g_o = o$$

If the group is isolated:

$$\alpha_o = o$$

For each group element $E_i$ in G, $i \in [1, n]$:

$$b = \begin{cases} o & \text{if the group is knockout} \\ i-1 & \text{otherwise} \end{cases}$$

$$\langle Cs_i, fj_i, \alpha j_i \rangle = \begin{cases} \text{Composite}(C_b, \alpha_b, E_i) & \text{if } E_i \text{ is a group} \\ \text{intrinsic color, shape, and(shape}\cdot\text{opacity) of } E_i & \text{otherwise} \end{cases}$$

$$fs_i = fj_i \cdot fk_i \cdot fm_i$$

$$\alpha s_i = \alpha j_i \cdot (fk_i \cdot qk_i) \cdot (fm_i \cdot qm_i)$$

$$fg_i = \text{Union}(fg_{i-1}, fs_i)$$

$$\alpha g_i = (1-fs_i)\cdot \alpha g_{i-1} + (fs_i - \alpha s_i)\cdot \alpha g_b + \alpha s_i$$

$$\alpha_i = \text{Union}(\alpha_o, \alpha g_i)$$

$$Ct = (fs_i - \alpha s_i)\cdot \alpha_b \cdot C_b + \alpha s_i \cdot ((1-\alpha_b)\cdot Cs_i + \alpha_b \cdot B_i(C_b, Cs_i))$$

$$C_i = \frac{(1-fs_i)\cdot \alpha_{i-1}\cdot C_{i-1} + Ct}{\alpha_i}$$

Result:

$$C = C_n + (C_n - C_o)\cdot \left(\frac{\alpha_o}{\alpha g_n} - \alpha_o\right)$$

$$f = fg_n$$

$$\alpha = \alpha g_n$$

Note that these formulas are in their most general form. They can be significantly simplified when some sources of shape and opacity are not present or when shape and opacity need not be maintained separately. Furthermore, in each specific type of group (isolated or not, knockout or not), some terms of these equations cancel or drop out. An efficient implementation will use simplified equations.

All of the elements painted onto a page (both top-level groups and top-level objects) that are not part of any group may be treated as if they were contained in a non-isolated, non-knockout group P whose elements are composited in the usual way onto a white backdrop. The color C of the page at a given point is defined by:

$$\langle Cg, fg, \alpha g \rangle = \text{Composite}(W, 1, P)$$

$$C = (1-\alpha g)\cdot W + \alpha g \cdot Cg \quad \text{(Eq. 2)}$$

where the variable definitions are given in the table below. The first formula computes the color and alpha for the group given a white backdrop; the second composites the results with that backdrop (using Normal blend mode). It should be noted that the second formula is not really needed, because the C result is identical to the $C_n$ variable at the end of execution of Composite. The second formula merely restores the backdrop contribution that is removed at the end of Composite.

| Variable | Meaning |
| --- | --- |
| $\alpha g$ | Computed alpha of the group |
| C | Color of the page |
| Cg | Computed color of the group |
| fg | Computed shape of the group (this result is discarded) |
| P | A group consisting of all elements $E_1 \ldots E_n$ in the page's top-level stack |
| W | The color white in the page group's color space (all components 1 if the color space is additive, 0 if subtractive). |

Ordinarily, the page group's color space will be the same as the native color space of the output device—that is, a device color space. However, it may be useful to allow specification of an explicit color space, particularly a device-independent color space, to ensure more predictable results. In this case, all page-level compositing is done in that color space, with the entire result then converted to the native color space of the output device. This case also arises when the page is not actually being rendered but is converted to a "flattened" representation in an opaque imaging model, such as PostScript.

Because the page starts out fully opaque and the accumulated shape and opacity never decrease, it is unnecessary for the page group to accumulate the result shape and opacity. This significantly simplifies the transparency compositing formulas; an efficient implementation will certainly use the simplified forms. The complete Composite function for the page group is as follows:

Initialization:

$C_o = w$

For each group element $E_i$ in P, $i \in [1, n]$:

$$\langle Cs_i, f\!j_i, \alpha j_i \rangle = \begin{cases} \text{Composite}(C_{i-1}, \alpha_{i-1}, E_i) & \text{if } E_i \text{ is a group} \\ \text{intrinsic color, shape, and(shape} \cdot \text{opacity)of } E_i & \text{otherwise} \end{cases}$$

$\alpha s_i = \alpha j_i \cdot (fk_i \cdot qk_i) \cdot (fm_i \cdot qm_i)$ $C_i = (1 - \alpha s_i) \cdot C_{i-1} + \alpha s_i \cdot B_i(C_{i-1}, Cs_i)$ The result color for the page is simply $C_n$.

Earlier sections have mentioned the mask shape, fm, and mask opacity, qm, that are contributors to the source shape and opacity. These enable shape and opacity to originate from a source that is independent of the objects being composited. A soft mask (or just mask for short) defines values that can vary across different points on the page. The word "soft" emphasizes that the mask value at a given point is not just 0 or 1 but can take on fractional values.

A mask used as a source of shape values is also called a soft clip. The soft clip is a generalization of the hard clip: a hard clip can be represented as a soft clip having opacity 1 inside and 0 outside the clipping path. Everywhere inside a hard clipping path, a source objects color replaces the backdrop; everywhere outside, the backdrop shows through unchanged. With a soft clip, on the other hand, one can create a gradual transition between an object and the backdrop, such as in a vignette. (Although "soft clip" suggests a vignette around an enclosed area, in fact the value of the mask can be an arbitrary function of position.)

A mask is typically the only means of providing position-dependent opacity, since elementary objects do not have intrinsic opacity.

A mask can be defined by creating a group and then painting objects into it, thereby defining color, shape, and opacity in the usual way. The resulting group can then be treated as a mask by following one of the two procedures described below.

The color, shape, and opacity of the group G are first computed by the usual formula:

$\langle C, f, \alpha \rangle = \text{Composite}(C_o, \alpha_o, G)$ where $C_o$ and $a_o$ are an arbitrary backdrop whose value does not contribute to the eventual result. The C, f, and a results are the group's color, shape, and alpha, with the backdrop factored out.

The mask value at each point is then simply the alpha of the group. In this case, the group's color is not used, and thus there is no need to compute it.

The group is composited with a fully-opaque backdrop of some selected color. The mask value at any given point is then defined to be the luminosity of the resulting color. This enables the mask to be derived from the shape and color of an arbitrary piece of artwork, drawn with ordinary painting operators.

The color C used to create the mask from a group G is defined by:

$\langle Cg, fg, \alpha g \rangle = \text{Composite}(C_o, 1, G)$ $C = (1 - \alpha g) \cdot C_o + \alpha g \cdot Cg$ where $C_0$ is the selected backdrop color. This is essentially the same as the page group computation given in Equation 2, above, and summarized in the table following it, except that an arbitrary backdrop color (rather than just white) can be specified. Once again, the C result is identical to the $C_n$ variable at the end of execution of Composite. If the backdrop removal computation at the end of Composite is omitted, then the second formula above is not needed. G can be any kind of group—isolated or not, knockout or not—with various effects in the C result produced in each case. The color C is then converted to luminosity in any conventional way.

The backdrop color that is most likely to be useful is black. If the backdrop is black, any areas outside the group's shape will end up with a zero luminosity value in the resulting mask. If we view the contents of the group as a positive mask, this result matches our expectations with respect to the points that are outside the shape.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

What is claimed is:

1. A method for processing digital graphical elements, comprising:

receiving a stack of digital graphical elements including a group, the group being a set of two or more contiguous digital graphical elements in the stack of digital graphical elements, digital graphical elements beneath the group in the stack specifying a backdrop for the group determining whether the group is designated as an isolated group, wherein a group is designated as an isolated group if the group has an attribute that expressly designates it as being an isolated group; and compositing the digital graphical elements of the group to calculate a resulting color for the group, the compositing of the digital graphical elements of the group disregarding any color of the backdrop for the group in the stack if the group is designated as an isolated group, and treating the result of the compositing as if the group were a single element in the stack.

2. The method of claim 1, wherein the digital graphical elements of the group comprise a raster object.

3. The method of claim 1, wherein the digital graphical elements of the group comprise a vector object.

4. The method of claim 1, wherein the digital graphical elements of the group comprise a second group.

5. The method of claim 1, wherein the digital graphical elements of the group comprise both a raster object and a vector object.

6. The method of claim 1, further comprising:

compositing the resulting color of the group with a color of the backdrop for the group in the stack.

7. The method of claim 1, wherein:

compositing the digital graphical elements of the group comprises compositing the digital graphical elements of the group onto a fully transparent initial backdrop if the group is designated as an isolated group.

8. The method of claim 1, wherein:

the digital graphical elements in the group include one or more transparent digital graphical elements.

9. The method of claim 1, wherein:

if the group is designated as an isolated group, the group has a blending color space independent of the blending color space of the backdrop for the group.

10. The method of claim 1, wherein;

one or more of a blend mode, a shape, or an opacity are associated with the group as a whole and used when compositing the group with the backdrop for the group.

11. The method of claim 1, wherein:

the group is an element of a hierarchical tree structure of nested elements defining an appearance of a page.

12. The method of claim 1, wherein:

the group is the set of two or more contiguous digital graphical elements grouped by a user.

13. A computer program product, tangibly stored on a computer-readable medium, for compositing digital graphical elements, comprising instructions operable to cause a programmable processor to:

receive a group of two or more contiguous digital graphical elements in a stack of digital graphical elements, digital graphical elements beneath the group in the stack specifying a backdrop for the group;

determine whether the group is designated as an isolated group, wherein a group is designated as an isolated group if the group has an attribute that expressly designates it as being an isolated group; and composite the digital graphical elements of the group to calculate a resulting color for the group, the compositing of the digital graphical elements of the group disregarding any color of the backdrop for the group in the stack if the group is designated as an isolated group, and treating the result of the compositing as if the group were a single element in the stack.

14. The product of claim 13, wherein the digital graphical elements of the group comprise a raster object.

15. The product of claim 13, wherein the digital graphical elements of the group comprise a vector object.

16. The product of claim 13, wherein the digital graphical elements of the group comprise a second group.

17. The product of claim 13, wherein the digital graphical elements of the group comprise both a raster object and a vector object.

18. The computer program product of claim 13, further comprising instructions operable to cause a programmable processor to:

composite the resulting color of the group with a color of the backdrop for the group in the stack.

19. The computer program product of claim 13, wherein the instructions operable to cause a programmable processor to composite the digital graphical elements of the group include instructions operable to cause a programmable processor to:

composite the digital graphical elements of the group onto a fully transparent initial backdrop if the group is designated as an isolated group.

20. The product of claim 13, wherein:

the digital graphical elements in the group include one or more transparent digital graphical elements.

21. The product of claim 13, wherein:

if the group is designated as an isolated group, the group has a blending color space independent of the blending color space of the backdrop for the group.

22. The product of claim 13, further comprising instructions operable to cause the programmable processor to:

associate one or more of a blend mode, a shape, or an opacity with the group as a whole for use when compositing the group with the backdrop for the group.

23. The product of claim 13, wherein:

the group is an element of a hierarchical tree structure of nested elements defining an appearance of a page.

24. The product of claim 13, further comprising instructions operable to cause the programmable processor to:

receive user input grouping the two or more contiguous digital graphical elements into the group.

* * * * *